United States Patent [19]
Rosmarinofski

[11] 4,193,526
[45] Mar. 18, 1980

[54] TWO-WHEELED VEHICLE CARRIER

[76] Inventor: Donald D. Rosmarinofski, 13 Blue Jay Rd., Lynnfield, Mass. 01940

[21] Appl. No.: 819,399

[22] Filed: Jul. 27, 1977

[51] Int. Cl.² .............................................. B60R 9/10
[52] U.S. Cl. .................................. 224/273; 224/309; 280/292; 414/462
[58] Field of Search ............ 224/29 R, 29 L, 42.03 R, 224/42.03 A, 42.03 B, 42.06, 42.07, 42.08, 42.32, 42.43, 42.44, 273, 309, 310, 315, 317, 321, 322; 280/292, 402; 214/450; 211/17, 18, 19, 20; D12/157, 158; 414/462

[56] References Cited
U.S. PATENT DOCUMENTS

| | | | |
|---|---|---|---|
| 1,865,365 | 6/1932 | Foote | 224/42.44 X |
| 2,541,244 | 2/1951 | Hack | 224/42.44 X |
| 2,576,222 | 11/1951 | Hill | 224/42.03 B |
| 3,275,206 | 9/1966 | Croft | 224/42.03 B |
| 3,744,689 | 7/1973 | Kjensuo | 224/42.03 B |
| 3,891,132 | 6/1975 | Chandler | 224/42.03 B |
| 3,892,321 | 7/1975 | Westbrook, Jr. | D12/158 X |
| 3,912,139 | 10/1975 | Bowman | 224/29 R |

*Primary Examiner*—Charles E. Frankfort
*Assistant Examiner*—Winston H. Douglas
*Attorney, Agent, or Firm*—Joseph H. Killion

[57] ABSTRACT

An improved two-wheeled vehicle carrier detachably connectable to a vehicle having a tow-bar is disclosed and comprises a carry-bar detachably connecting to the tow-bar in a substantially horizontal manner and connectors to detachably connect the carry-bar to the tow-bar. A pair of pivoting wheel cradles are adjustably mounted to the carry-bar to retain the wheels of the two-wheeled vehicle. Mountings adjustably connect the pair of pivoting wheel cradles to the carry-bar.

4 Claims, 9 Drawing Figures

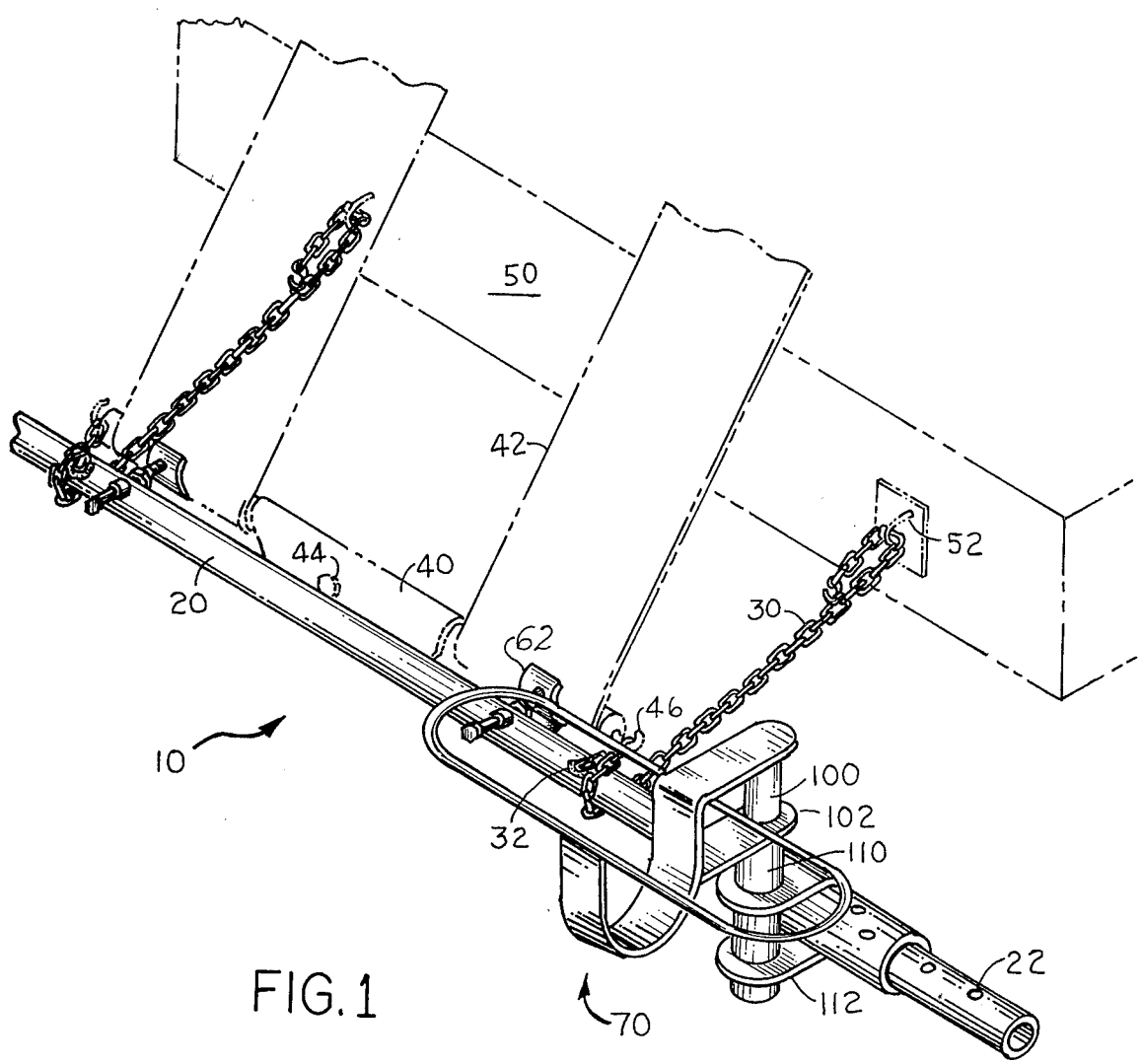
FIG. 1
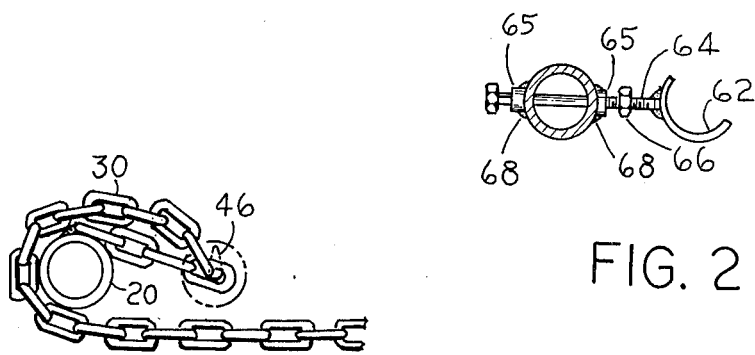
FIG. 2
FIG. 3

TWO-WHEELED VEHICLE CARRIER

BACKGROUND OF THE INVENTION

This invention relates to a carrier for two-wheeled vehiles, particularly a carrier to be adapted to a tow-bar to carry motor-cycles.

At the present time commercial towing of a motor-cycle presents a number of problems. Traffic laws in some states prohibit towing by putting the violating motor-cycle in the back of a truck. This method of dealing with traffic violators is prohibited to prevent theft of the motor-cycle. Another problem occurs when a motor-cycle wheel is locked off center or twisted in an accident. The present art relies completely on parallel alignment of the motor-cycle wheels.

There are a number of devices disclosed in the Prior Art.

U.S. Pat. No. 3,275,206 discloses a sports cycle carrier to be used and attached to an automobile bumper. One difficulty with this device is that it is not adaptable to a tow-bar, but depends on interlocking with the vehicle bumper. Another disadvantage is that the wheels have to be aligned in a horizontal plane for the vehicle to be carried with this device. If a motor-cycle is locked unaligned or twisted in an accident this device is useless for transportation of the motor-cycle.

Similar devices are the subject of U.S. Pat. No. 3,853,255 which discloses two arc-shaped wheel recesses detachably secured to a trailer hitch, and U.S. Pat. No. 3,744,689 which discloses a carrier attached to the bumper of a vehicle.

U.S. Pat. No. 3,912,098 discloses a motor-cycle container carrier which comprises a ramp member. In addition to lack of adaptability to a tow-bar, this device is not adaptable to carry a motor-cycle with non-aligned wheels.

There is then a need for a detachable carrier, adaptable to a tow-bar, having wheel recesses which are adjustable for a motor-cycle, the wheels of which are non-aligned. Other needs are that the device be quickly installed or removed, take up little room when detached, be sturdy enough to carry a heavy motor-cycle and adjustable in a situation where there is a worn tow-bar.

SUMMARY OF INVENTION

My invention relates to an improved two-wheeled vehicle carrier.

I have discovered an improved two-wheeled vehicle carrier which is detachably connectable to a vehicle having a tow-bar comprising a carry-bar means detachably connecting with said tow-bar in a substantially horizontal manner. Means are provided to detachably connect the carry-bar means to said tow-bar and a pair of pivoting wheel cradle means are adjustably mounted to said carry-bar means to retain the wheels of said two-wheeled vehicle. Mounting means adjustably mount said pair of pivoting wheel cradle means to said carry-bar means.

Preferably and optionally a pair of stabilizer means more fully described in the preferred embodiment are utilized to permit a certain space between the carry-bar means and the tow-bar to minimize distortion of the carry-bar means by the stress and strain in use. Also optionally an alternative embodiment discloses a split-loop wheel cradle means particularly of the type having a hinge on the vertical strip and utilizing a simple pin to lock it in the closed position.

I prefer to have a parallel series of holes in the annular sleeve member to adjust vertically for a worn tow-bar. When weight is constantly put on a tow-bar assembly, the assembly tends to sag slightly. Without adjustment the wheel cradle means when positioned depart from horizontal alignment. In my device this sagging is compensatable and the wheel cradle means are retained in horizontal alignment.

The carry-bar means should be made of a strong material, particularly a metal and more particularly steel to have the strength to withstand the stress and strain of use. I prefer that adjustment for difference in the two-wheeled vehicle wheel displacement be made by a series of adjustment slots at each end of the carry-bar means, particularly by incorporating at each end two rows of horizontal adjustment slots one on the top and one on the bottom. A locking pin is positioned therethrough after positioning of the pivoting wheel cradle means.

The connecting means, particularly a pair of chain members and more particularly a pair of steel chains composed of strong closed links are used to connect the carry-bar means to the tow-bar by fitting one of the links over the hooks at each end of one form of conventional tow-bar or through each loop on another form of conventional tow-bar.

I prefer that the chain members after connection with the tow-bar be drawn under the carry-bar means once more and then are extended to and through a connection, particularly a ring fixed to the back of the vehicle having a tow-bar and secured to prevent excessive swaying of the two-wheeled vehicle carrier.

The mounting means are more fully described in the preferred embodiment. I prefer that the mounting means be of the sleeve type, particularly of the annular sleeve type and more particularly, as described in the preferred embodiment, a perforated annular sleeve coupled to the preferred carry-bar means by lining up the holes therein with the horizontal adjustment slots of the preferred carry-bar means and locking them into place with a locking pin. The particular adjustment slot which properly compensates for the condition of the tow-bar is selected and this adjustment slot is set over the pair of aligned and diometrically opposed perforations in the carry bar means. The locking pin is then inserted through the annular sleeve and the carry bar means and the annular sleeve is set at that position of the carrier bar means.

It is important that the wheel cradle means be pivotable. In the preferred embodiment a coupling pin/coupling pin receiving slot, particularly an external coupling pin/coupling pin receiving slot is described. It is within the spirit and scope of the invention that an internal coupling pin/coupling pin receiving slot be utilized. The wheel cradle means which are detachable are positioned in the coupling pin receiving slots and are rotatable about an axis. This is to adjust for the non-alignment of the wheels of a motor-cycle that has been locked in an off-center position or was twisted in an accident. After the wheels of the motor-cycle are positioned in the wheel cradle means the weight of the motor-cycle are positioned in the wheel cradle means the weight of the motor-cycle holds the wheel cradle means stable.

I prefer the wheel cradle means more fully described in the preferred embodiment be metal, particularly steel, to withstand the stress and strain in use.

I prefer that the wheel cradle means have an encircling substantially horizontal loop further retaining of the wheels of the two-wheeled vehicle and a substantially vertical strip to rest the wheels thereon.

My invention provides numerous advantages over the Prior Art.

It is an advantage of my invention that it can carry two-wheeled vehicles with aligned and non-aligned wheels. My invention is dismantled into the carrier bar means, the two wheel cradle means and the locking pins. Therefore it can be quickly removed and put in the back of the tow-truck when not in use.

It is an advantage of my invention that it is quickly secured or removed from a standard tow-bar.

Another advantage of my invention is that it is adjustable to fit a loose or tight tow-bar.

Further advantages of my invention are that it is strong and durable in use and economical to manufacture.

BRIEF DESCRIPTION OF THE DRAWINGS

FIG. 1 is a perspective isometric view showing detail of one side of the two-wheeled vehicle carrier.

FIG. 2 is a side cross-sectional view of the stabilizer means depicted in FIG. 1.

FIG. 3 is a side cross-sectional view of the carry-bar means of FIG. 1 depicting the configuration of the chain.

DETAILED DESCRIPTION OF THE DRAWINGS

Figure 4:
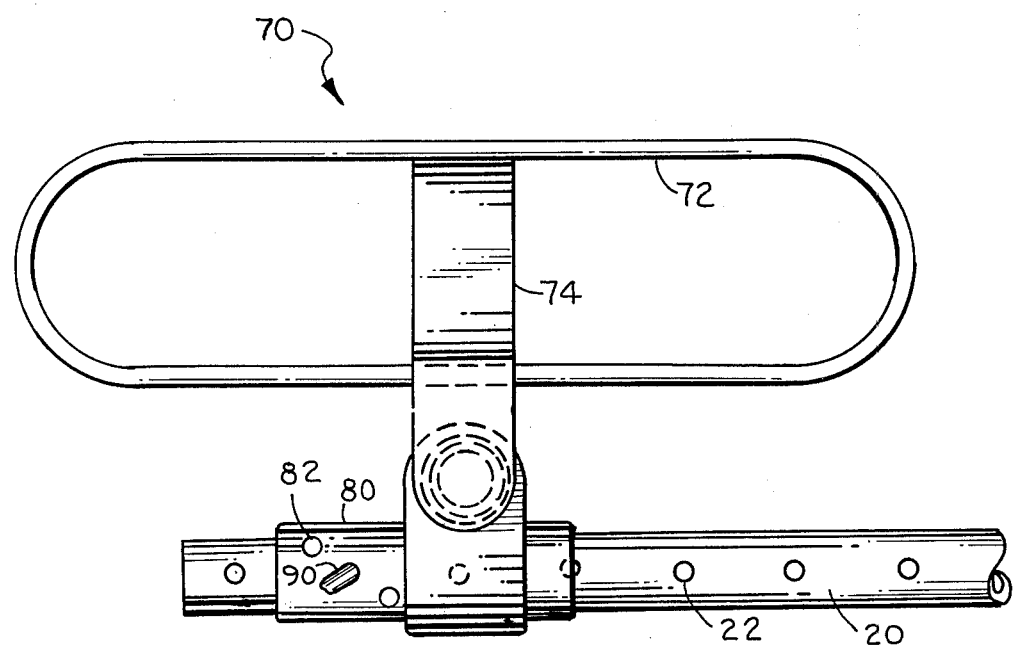
FIG. 4 is a top elevational view of the pivoting wheel cradle means and its connection to the carry-bar means.

Referring now in particular to the accompanying drawings, my two-wheeled vehicle carrier is generally indicated in FIG. 1 at 10. Since sides both incorporate the same principles only one side will be numbered for the sake of clarity.

The two-wheeled vehicle carrier includes carry-bar 20, having horizontal adjustment slots 22, and chain 30, welded at 32, to the carry-bar and extending to tow-bar 40, having fastening bolt 44 and connecting a link of the chain over hook end 46 of the tow-bar. The chain then passes back under the carry-bar (FIG. 3) and extends then to ring 52, fastened to vehicle rear 50 the chain is then attached to itself by the open link on the end thereof. This minimizes swaying of the two-wheeled vehicle carrier.

Stabilizer cup 62, abuts the tow-bar to keep a space between the tow-bar and the carry-bar and prevent distortion of the carry-bar.

Pivoting wheel cradle 70, having coupling rod 100, and strengthening flange 102, connects to coupling rod receiver 110, having stengthening flange 112.

FIG. 2 shows details of the stabilizer including fixed bosses 65, welded to carry-bar at 68 and having threaded adjusting section 64, with adjustment nut 66, and ending in stabilizer cup 62.

Figure 5:
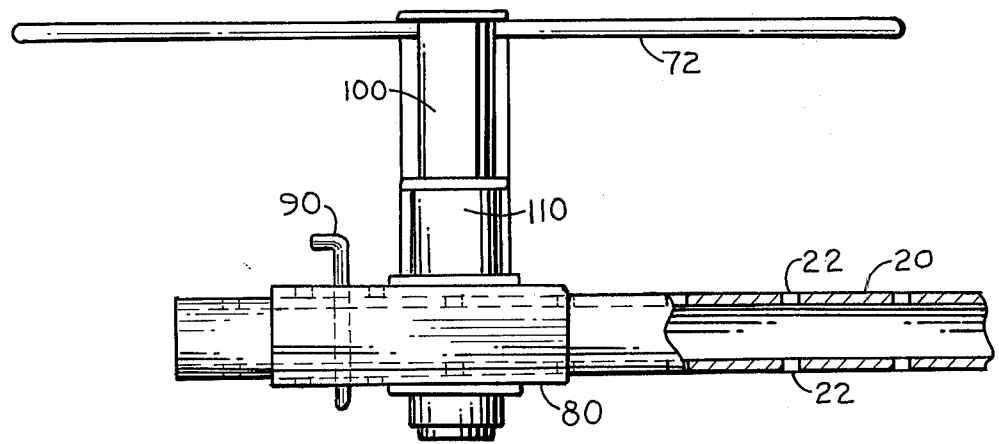
FIG. 5 is a side cross-sectional partially fragmented view of the pivoting wheel cradle means depicting the connection of coupling rod and coupling rod receiving slots.

FIGS. 4 and 5 show top horizontal adjustment slot 22 and bottom horizontal adjustment slots 22 of carry-bar 20, and annular sleeve 80 having vertical adjustment holes 82, adjusted over the carry-bar and held in place by locking pin 90, which transfixes both the annular sleeve and the carry-bar. Pivoting wheel cradle 70, includes horizontal loop member 72, and vertical strap 74. In FIG. 5 coupling rod 100 couples with coupling rod receiver 110.

Figure 6:
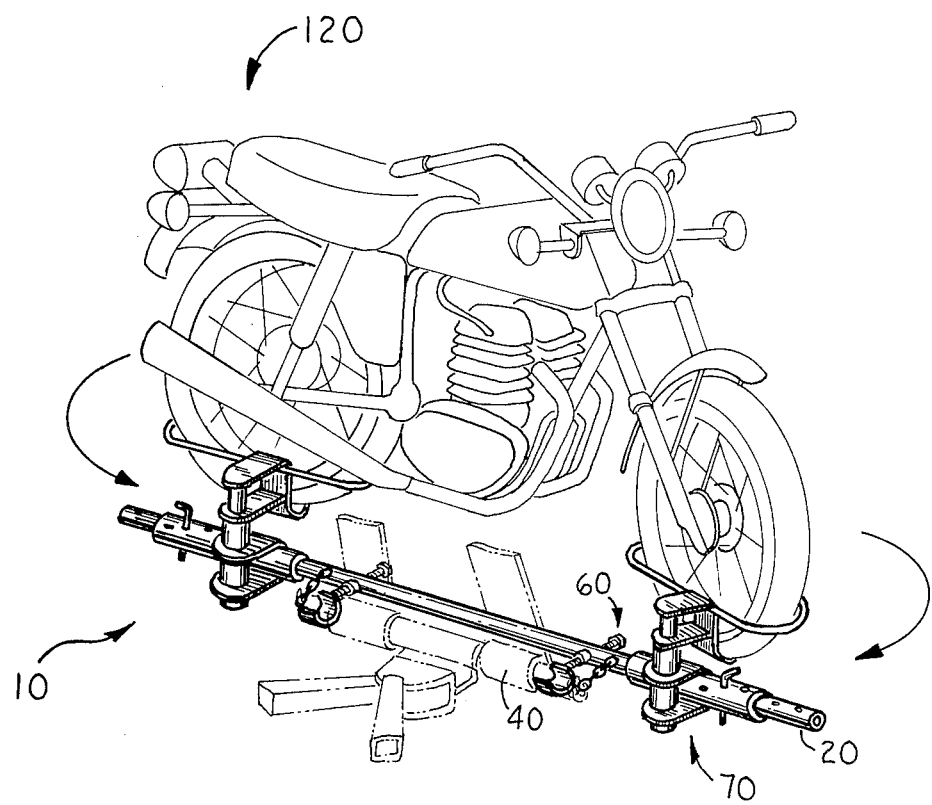
FIG. 6 is a perspective, illustrative back view of a motor-cycle resting in the two-wheeled vehicle carrier.

FIG. 6 shows motorcycle 120, with a non-aligned front wheel fitting into the two-wheeled vehicle carrier and the pivoting of the wheel cradle.

Figure 7:
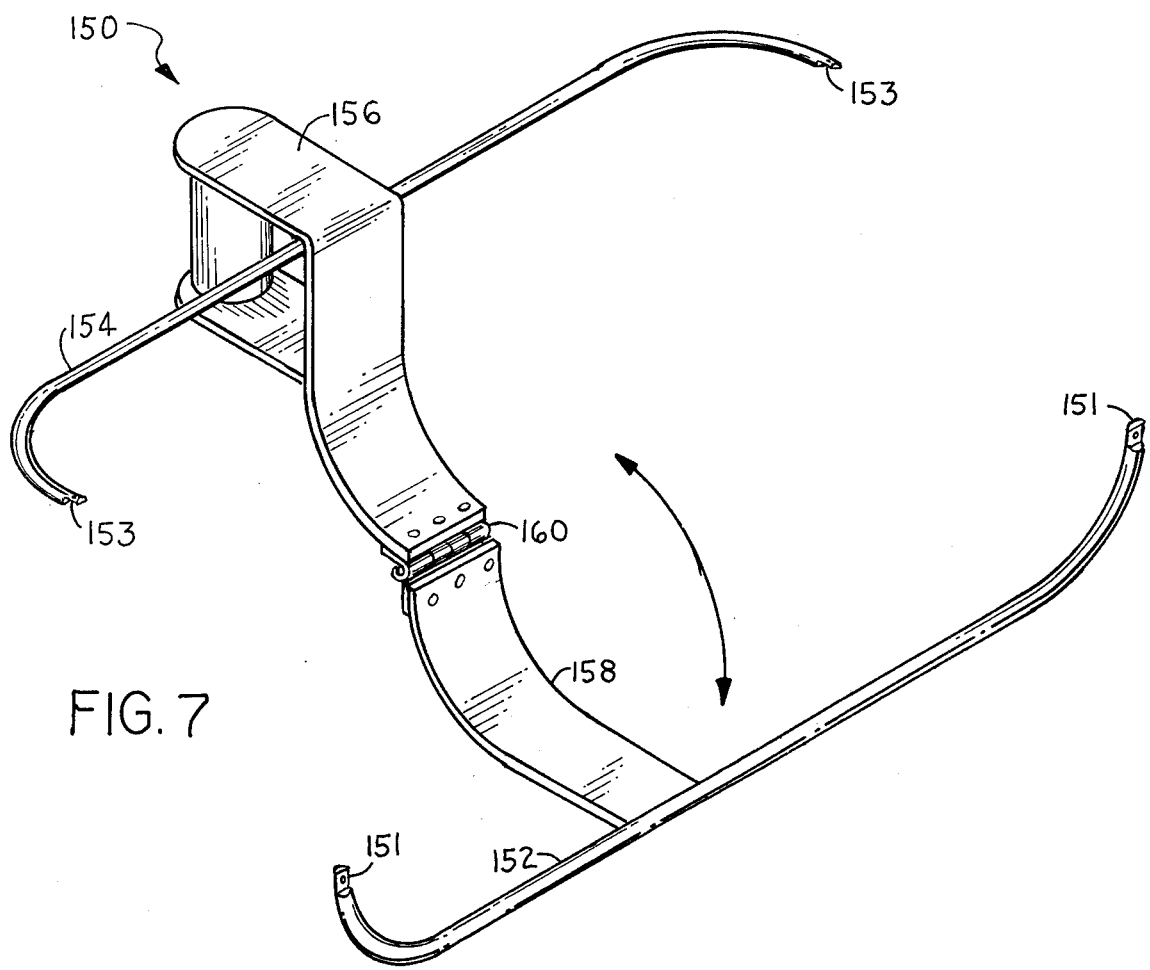
FIG. 7 is a perspective, illustrative view of an alternative embodiment of the pivoting wheel cradle means showing a hinged pivoting wheel cradle means.
Figure 8:
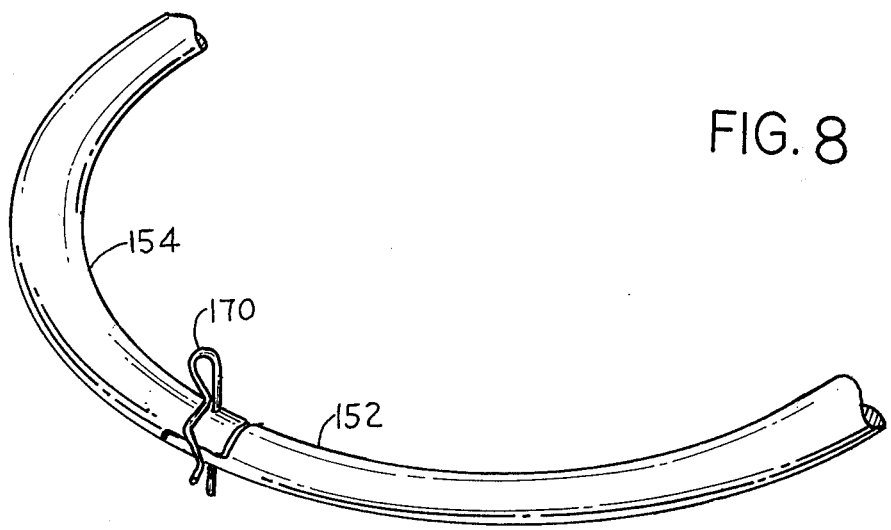
FIG. 8 is an enlarged, perspective view of the ends of the split encircling loop joined by a pin.

FIGS. 7 and 8 depict an open alternative embodiment 150, of the wheel cradle and include front loop section 152, having perforated ends 151, and back member 154, having perforated ends 153. The vertical strip has top portion 156 and bottom portion 158 swingingly engaged at hinges 160.

Pin 170 (FIG. 8) locks the loop sections in the closed position.

Figure 9:
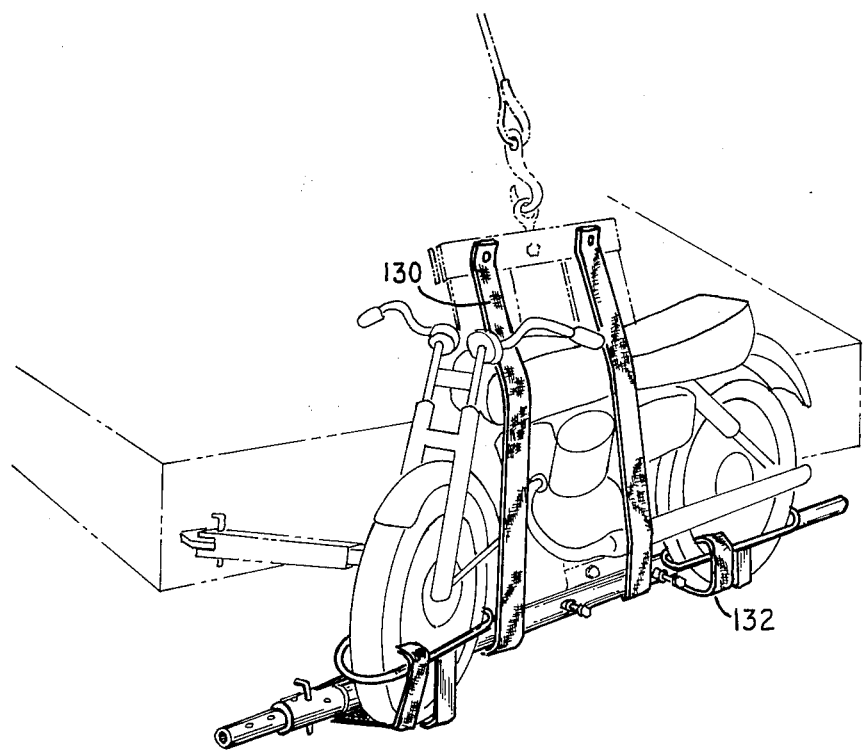
FIG. 9 is a perspective, illustrative view of the two-wheeled vehicle carrier showing straps positioned to return the motor-cycle to the carrier.

FIG. 9 shows wheel strap 132 for retaining the motor-cycle wheels in the pivoting wheel cradles and body straps 130 preventing the motor-cycle from falling over.

Typically in use the carry-bar is positioned and the chains are slipped over the hook ends of the tow-bar and back around the carry-bar, through the hooks on the back of the towing vehicle and locked onto itself by the open link on the end.

The annular sleeves are then slipped over the carry-bar, adjusted horizontally for the motor-cycle wheels and vertically for the condition of the tow-bar and the locking pin is pushed into place.

The coupling pins joined to the wheel cradles are then fitted into the coupling pin receivers.

The wheel cradles are then pivoted as necessary for the alignment of the motor-cycle wheels and the motor-cycle is lifted into place so that the motor-cycle wheels rest in the wheel cradles.

The wheel straps and body straps are then fastened and the two-wheeled vehicle carrier is ready to be used for transporting the two-wheeled vehicle.

What I claim is:

1. A two-wheeled vehicle carrier for a vehicle having a tow-bar comprising:
 (a) carry-bar means detachably connecting with and substantially horizontal to said tow-bar and having at each end thereof a pair of series of horizontal adjustment slots wherein one series of said horizontal adjustment slots is located on one side of said carry-bar means and is directly above the other series of said horizontal adjustment slots located on the other side of said carry-bar means;
 (b) a pair of ring means mounted to the back portion of said vehicle having a tow-bar;
 (c) a pair of chain members having a plurality of links and fixedly mounted to said carry-bar means on one end then extending to said tow-bar and detachably connecting to the ends thereof, each of said chain members further extendable to said ring means and therethrough and back upon itself and having an open link on the other end thereof to interconnect with a link thereof to lock said chain member in the desired position to take up slack and prevent swaying of said two-wheeled vehicle carrier when in use;

(d) a pair of wheel cradle means detachably and pivotally mounted to said carry-bar means and having a substantially horizontal loop member to encircle the bottom of a wheel of said two-wheeled vehicle and further having a substantially vertical metal strip fixedly mounted on one end to the outside of said substantially horizontal loop member and extending downwardly therefrom to a rounded portion thereof and then upwardly to the inside of said substantially horizontal loop member and then to said mounting means to rest the wheel of said two-wheeled vehicle thereon and having a substantially round coupling rod means fixedly mounted to each of said wheel cradle means, (e) a pair of mounting means detachably and pivotally connecting said pair of wheel cradle means to said carry-bar means, each of said mounting means including an annular sleeve member having a pair of a series of mounting holes wherein one series of said mounting holes is located on one side of said annular sleeve member and the other series of said mounting holes is located on the opposite side of said annular sleeve member, each said annular sleeve member adapted to be fitted over an end of said carry-bar means and slidably adjustable over the pair of horizontal adjustment slots associated with that end of said carry-bar means, a substantially round coupling rod receiving slot fixedly mounted to each of said annular sleeve members and adapted to be pivotable around the circumference of said receiving slot;

(f) detachable locking pin means adapted to be fitted through said annular sleeve member mounting holes and said horizontal adjustment slots of said carry-bar means so as to lock the annular sleeve member onto said carry-bar means;

(g) a pin means welded to and transfixing said carry-bar means and having a concavely tapered end thereof adapted to and abutting said tow-bar to align and stabilize said carry-bar means.

2. A two-wheeled vehicle carrier for a vehicle having a tow-bar comprising:

(a) carry-bar means detachably connecting with and substantially horizontal to said tow bar;

(b) means affixed to said carry-bar means to detachably connect said carry-bar means to said tow-bar;

(c) a pair of wheel cradle means detachably and pivotally mounted to said carry-bar means each of which includes a substantially horizontal loop member to encircle the bottom of a wheel of said two-wheeled vehicle and further having a substantially vertical metal strip fixedly mounted on one end to the outside of said substantially horizontal loop member and extending downwardly therefrom to a rounded portion thereof and then upwardly to the inside of said substantially horizontal loop member and then to a mounting means to rest a wheel of said two-wheeled vehicle thereon;

(d) said pair of mounting means detachably and pivotally connecting said pair of wheel cradle means to said carry-bar means each including a substantially round coupling rod receiving slot fixedly mounted to an annular sleeve member fitting over and slidably adjustable along said carry-bar means and a substantially round coupling rod means fixedly mounted to each of said wheel cradle means, adopted to be fitted into said coupling rod receiving slot, and pivotable around the circumference of said slot to adjust for the two-wheeled vehicle wheel alignment.

3. The two-wheeled vehicle carrier of claim 2 wherein each of the mounting means further comprises:

(a) said carry-bar means defining towards each end thereof two series of horizontal adjustment slots on opposite sides thereof and having one series of horizontal adjustment slots directly above the other;

(b) said pair of annular sleeve members each defining a pair of mounting holes on opposite sides thereof, one pair directly above the other, fitting over said carry-bar means and adjustable over said two series of horizontal adjustment slots;

(c) detachable locking pin means fitting through said annular sleeve member mounting holes and said horizontal adjustment slots of said carry bar means to lock the annular sleeve onto said carry-bar means.

4. The two-wheeled vehicle of claim 2 wherein each of said wheel cradle means further comprises:

(a) said substantially horizontal loop member split at both ends thereof and defining holes therein, moveable between a first closed position and a second open position;

(b) said substantially vertical metal strip having a hinged section thereupon and moveable between a first closed position and a second open position;

(c) detachable pin means passing through said holes in said loop member when said loop member is in said first closed position to lock said loop member.

* * * * *